March 3, 1936.  A. S. MACKENZIE  2,033,081
BURR EXTRACTOR
Filed Dec. 21, 1931  2 Sheets-Sheet 1

Inventor
Alexander S. Mackenzie,
By Cushman, Bryant Darby & Cushman
Attorneys

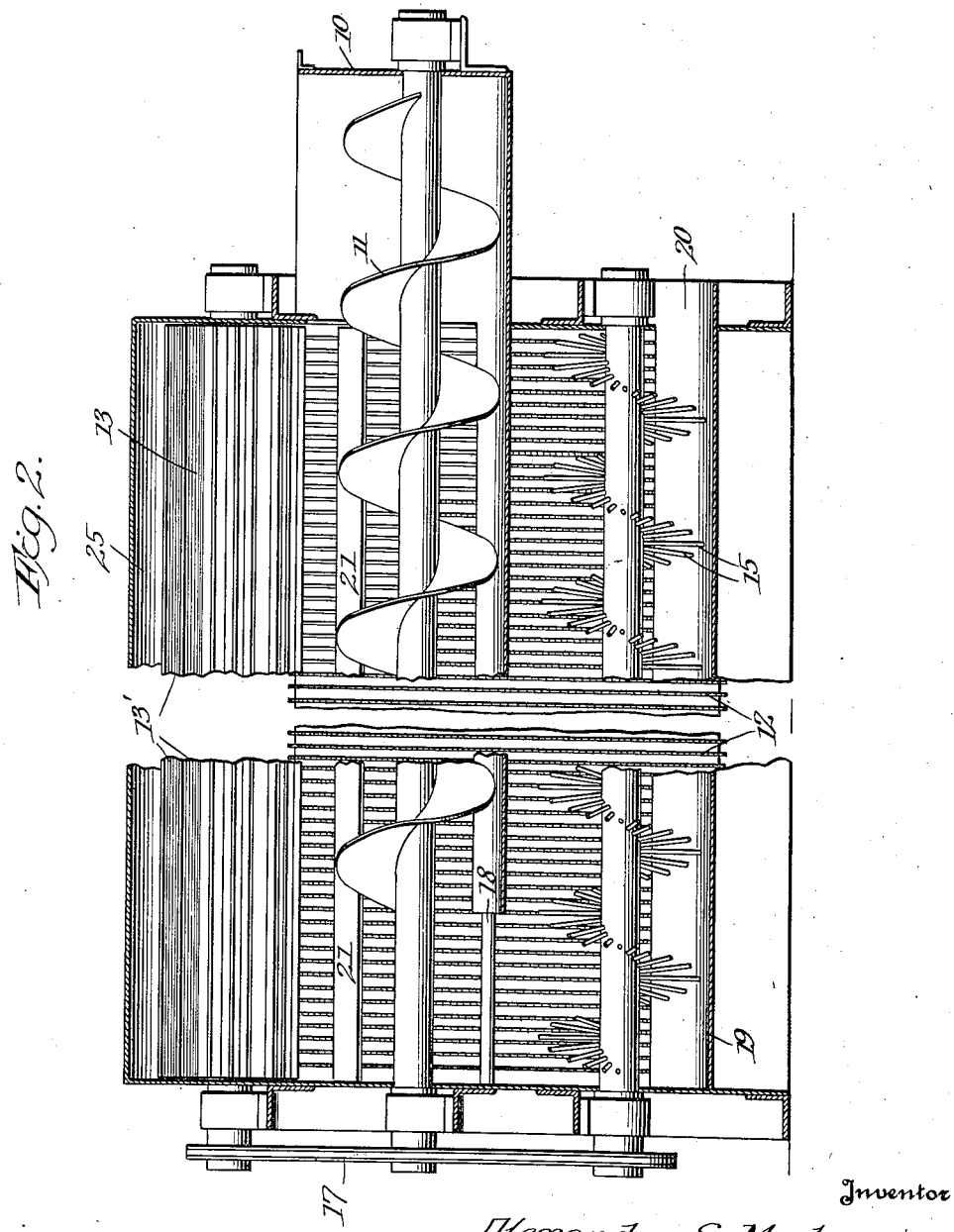

Patented Mar. 3, 1936

2,033,081

UNITED STATES PATENT OFFICE 2,033,081

BURR EXTRACTOR

Alexander S. Mackenzie, Houston, Tex., assignor, by mesne assignments, to Elk City Cotton Oil Company, a corporation of Oklahoma Application December 21, 1931, Serial No. 582,467

8 Claims. (Cl. 19—37)

The present invention relates to cotton burr extractors and embodies an improvement in construction and efficiency in operation over what has been the generally accepted practice.

One object of the invention is to deliver the cotton to be treated to the saw assembly in the direction of rotary movement of the saws as distinguished from previous methods wherein the cotton bolls are conveyed to the assembly in a direction contrary to the rotary movement of the saws.

A further object of the invention is to provide a means for continuously regulating the layer of bolls and cotton which is carried by the saws to the stripper roll and at the same time strip off and throw the excess material back into the feeding conveyor, whence it will be returned to the saw assembly.

A further object of the invention is to utilize a stripper plate to cooperate with the stripper roll, whereby the bolls and trash thrown off by the roll are caused to be distributed in the conveyor in such manner that they are mixed with the incoming untreated cotton and treated therewith. In this manner, the stripper plate acts as a dividing means, as well as a distributor, to prevent the material thrown off by the stripper roll from coming in contact with that portion of the untreated cotton and bolls which is being acted upon or about to be acted upon by the saws.

A further object of the invention consists in providing a trash conveyor which moves to throw the bolls, cotton and hulls in contact with the saw assembly, for additional cleaning and recovering of fibers and like the main conveyor throws the material into contact with the saw assembly in the same direction of rotary movement as the saws.

There is provided in cooperation with this trash conveyor a stripper plate which will strip off any excess bolls or trash carried from said conveyor by the saws, thereby cooperating with the main conveyor to the extent that as the saws in their rotary movement travel into contact with the untreated cotton passed to the saw assembly by the main conveyor, the layer collected from the trash conveyor will not clog the saw teeth which will therefore be free to act upon the untreated cotton bolls in the usual manner.

It is an additional feature of this invention that the stripper roll and the brush roll rotate in opposite directions within suitable hoods or casings. In the case of the stripper roll, means are provided to eliminate the creation of a draft in the hood by its rotary movement such as would interfere with the removal of the trash, bolls and other material by the stripper roll. The stripper roll casing acts also to remove bolls from the roll. At the same time the cotton which collects on the saw blades will be firmly held thereon by the draft in the casing and carried to the brush roll. The brush roll rotates in the opposite direction from the stripper roll and in addition to brushing off the cotton which clings to the saw blades or is carried thereby, a draft is set up in the direction of discharge, so that the cotton will be efficiently removed from the saw assembly.

Referring to the drawings,

Figure 2 is a longitudinal section of the machine.

Figure 1:
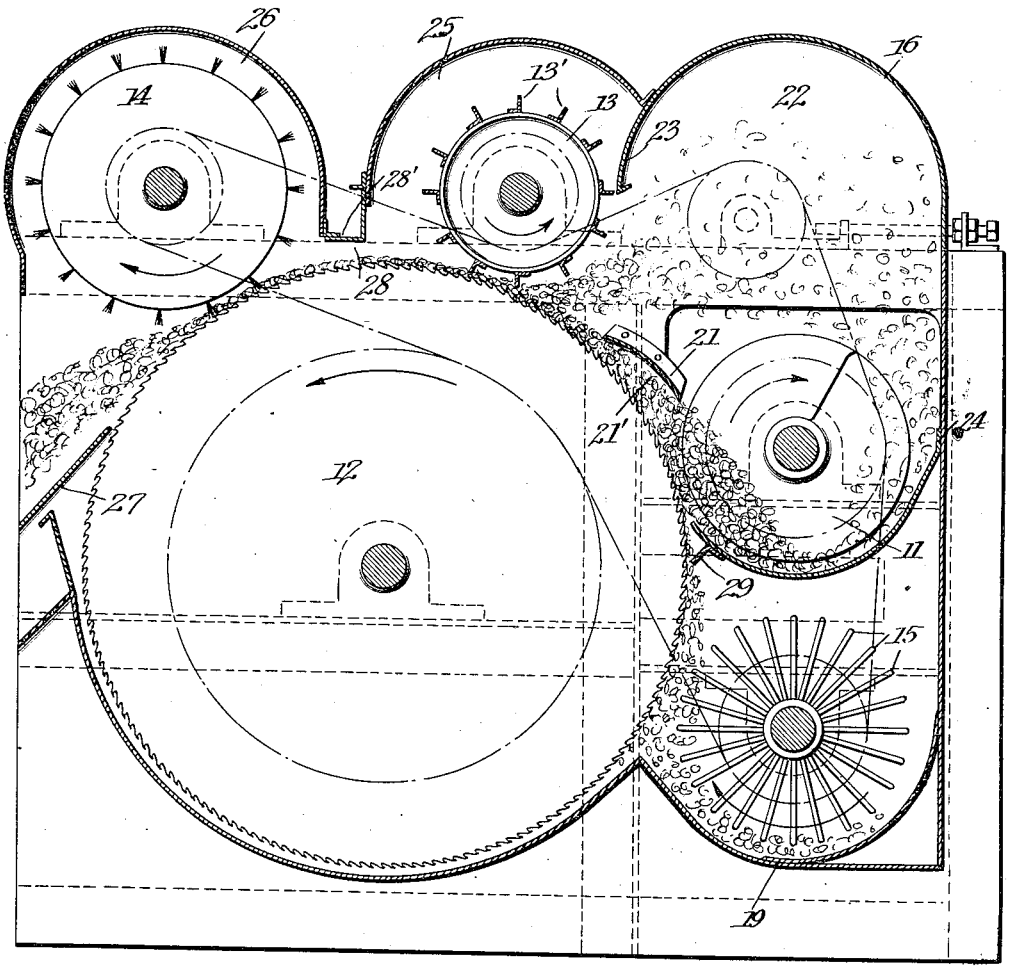
Figure 1 is a transverse section of the machine.

The uncleaned cotton comprising bolls, trash and other customary matter is fed into the conveyor trough 10 and passed by the conveyor 11 longitudinally through the machine adjacent to saw assembly 12. The stripper roll is indicated at 13 and the brush roll at 14. The trash conveyor 15 acts to also throw the bolls in contact with the saw assembly to assure that any uncleaned cotton or untreated cotton is treated and recovered. The conveyors 11 and 15 are disposed as shown within the confines of parallel lines extended from the ends of the vertical diameter of the saw assembly.

All of the instrumentalities extend longitudinally with respect to the saw assembly as shown in Figure 2, and are housed in a suitable casing which will be indicated as a whole at 16, the conveyor trough 10 and conveyor 11 extending beyond the casing at the feed side as shown in Figure 2.

Each of the rotating instrumentalities is mounted upon a shaft and the shafts extend exteriorly of the machine at the other side and are operated by a chain or belt 17 from any desired prime mover.

Upon reference to Figure 1, it will be observed that the saw assembly 12 is rotated in a counter-clockwise direction, while the respective conveyors 11 and 15 are rotated in a clockwise direction. The stripper roll is rotated in a counter-clockwise direction, while the brush roll is rotated in a clockwise direction.

The several instrumentalities extend longitudinally of the saw assembly and at one end the trough 10 is cut away, as shown at 18, whereby any untreated cotton, bolls, hulls and trash are dropped into the adjacent end of the conveyor 15 which it will be observed moves in a trough 19.

The flights of the conveyor 11 are so disposed as to carry the cotton and bolls upwardly into contact with the upwardly moving saw assembly, while transferring or conveying the bolls and cotton longitudinally across the saw assembly.

The flights of the conveyor 15, move the trash, bolls and uncleaned cotton delivered from the trough 10 upwardly into contact with the upwardly moving saw assembly in the same manner but are arranged to convey the material in a direction opposite to that in which it travels in the trough 10 and conveyor 11, so that the trash is delivered from the machine at 20 adjacent the feed end thereof.

By providing a construction wherein the saw assembly and the respective conveyors 11 and 15 move in the same direction, namely upwardly so that the untreated cotton in the first instance and the bolls and untreated cotton in the second instance are thrown in the same direction of movement as the saw assembly, I am enabled to obtain a very efficient cleaning action with consequent optimum recovery of cotton and minimum waste.

Disposed between the conveyor 11 and the stripper roll 13 is a shield or dividing plate 21, which, as shown in Figure 2, extends longitudinally throughout the length of the machine and prevents the bolls being thrown haphazardly and directly into contact with the stripper roll. This stripper plate 21 is arcuate in cross section as shown and its upper end or edge is disposed in close proximity to the saw assembly relative to its lower edge, whereby a flared or tapered passage 21' is provided. The divider or shield plate 21 is so disposed with relation to the conveyor 11, the saw assembly and the stripper roll as to accomplish a plurality of purposes.

One important purpose of this stripper plate is to regulate the layer of material on the saw assembly which is fed by the saw assembly into contact with the stripper roll 13. The advantage of this resides in presenting to the stripper roll, a continuous definite layer of substantially uniform thickness composed of cotton and bolls to be treated.

A further advantage of the plate 21 resides in its action as a stripper or breaker means, whereby it serves to crush or compress and break the bolls and thereby render the operation of the stripper roll much more satisfactory.

In addition and as a very essential feature, the stripper plate 21 or shield, is disposed intermediate the stripper 13 and conveyor 11 in such a manner that the material which is knocked off of the saw assembly by the roll 13 will not be returned downwardly to the conveyor, but will be thrown outwardly and directed to the far side of the conveyor to be thus distributed and mixed in the conveyor with the cotton which is being conveyed along the saw assembly. Referring to Figure 1, it will be observed that in the provision of the stripper plate 21 the bolls, the cotton and the trash are thrown by the stripper roll 13 in such a manner that they are deposited in the far side of the conveyor, whence they will be mixed with the untreated cotton. Thus the machine will be more efficient than where the bolls, trash and other matter were thrown directly into the conveyor and then immediately brought back into contact with the saw. With the present construction, moreover, the untreated cotton which has been or is being passed into contact with the saw assembly and that which is about to be moved into the saw assembly is not interfered with and the material thrown off by the stripper roll 13 is given a preliminary working or mixing with untreated material in the conveyor before it is again moved into contact with the saw assembly.

Cooperating with the shield or dividing plate 21 is the hood 22 having a wall or deflector plate 23 likewise extending longitudinally across the saw assembly positioned with respect to plate 21 so as to form a deflecting passage between the respective members. The relatively wide opening or passage between the saw assembly and the lower edge of the deflector plate 23, and the proximity of hood 22 and the space at that side of the machine eliminates the possibility of a draft such as would interfere with the stripper roll 13 in its action of throwing the trash and bolls outwardly of the saw assembly, and allows the said hulls and trash to be stripped and scattered outwardly above the plate 21 and hence distributed, as stated, to be deposited at the far side of the conveyor 10. In this connection it is to be noted that the side wall of the hood 22 merges with the side wall of the casing 16 which, in turn, is substantially flush with the side wall of the conveyor trough 10, as shown at 24. The deflector plate 23 extends in such close proximity to the stripper members 13' as to act as a stripper, and trash and hulls are thus prevented from being carried over into casing 25, and deposited on the saw teeth.

The stripper roll 13 moves in a hood 25 and at the opposite side from the opening defined by the plate 23 and saw assembly 12 by reason of the restricted passage 28 creates a sufficient draft to cause the cotton carried by the saw assembly to cling to the saw teeth.

The brush roll 14 which rotates in an opposite direction is mounted in a hood 26 and has the usual brush members for sweeping the cotton from the teeth. Also by reason of the rotary motion of the roll it acts as a blower producing an air current in the opposite direction which not only balances to some extent and prevents the cotton from lodging in the teeth by reason of the draft in the hood 25, but also has the effect of loosening the cotton on the teeth and assisting the brushes in sweeping and moving the cotton from the saw assembly into the chute or passage 27.

It is to be noted that this very desirable result is obtained by reason of the restricted passage defined between the casings 25 and 26 and the saw assembly as shown at 28. The length of this restricted passage can, of course, be regulated, as desired and as shown, the lower ends of adjacent sides of the casings are joined by a plate 28' defining the upper wall of the passage.

In this connection the extent of the opening defined by the stripper plate 23 and the saw assembly can likewise be regulated and I also employ means not shown for regulating the position of the shield or divider plate 21 to adjust the same for its several functions described.

It will be understood that the bolls and hulls discharged into the lower or trash conveyor 15 and moving in a direction opposite from material in the conveyor 11, contain or have carried with them an appreciable amount of cotton which can be recovered as well as hulls, bolls and trash. For this reason the material in the conveyor 15 is moved into contact with the saw assembly 12, as explained, and in order that this action will not only be efficient but will not interfere with the principal treating action, I employ a combined regulator and stripper plate indicated at 29 which is secured to the undersurface of the conveyor 24 adjacent the saw assembly and extends entirely across the saw assembly longitudinally thereof. This stripper plate is preferably a right angle member having its base secured to the trough and its other side projecting into proximity with the saw teeth. The distance or space between the edge of the stripper plate 29 and the saw assembly may be controlled by regulating the position of the stripper member upon the trough.

The function of this stripper member is to control the thickness of the layer of hulls, bolls, trash and cotton which is carried by the saw assembly upwardly past the trough 10 and conveyor 11. Since the material in the trough 19 includes a large amount of hulls and trash, there would be no advantage in having a very heavy layer on the saw assembly and carried in unrestricted manner to the stripper roll 13 or the shield or plate 21. Not only would such an uncontrolled layer of material be inefficient because it contains a relatively small amount of cotton, but the teeth would be so clogged that no material could be collected from the main conveyor 11. Therefore, the stripper plate 29 throws off substantially all of the freely clinging hulls, bolls and trash, whereby the saw assembly will carry principally the cotton fibers as it enters the field of the conveyor 11. Also this said plate acts as a breaker to crush and compress the bolls and hulls to free the fibers. Hence the teeth are available for their principal function, namely of acting upon the main body of cotton, hulls and trash which is being conveyed to the saw assembly by the conveyor 11. The stripper plate 29, since it extends through the length of the saw assembly, will throw the excess material back onto the conveyor 15, which is moving in a clockwise direction and hence the material so thrown off will not again come in contact with the saw teeth until after it has been thrown to the opposite side of the conveyor and thoroughly mixed with the mass in the trough 19. In this connection a divider plate such as shown at 21 may be placed between conveyor 15 and plate 29 if desired.

The present invention has been found unusually efficient and it will be understood that the casing 16 may be made in any suitable manner with the provision, however, of the several housings 22, 25 and 26 which I find enable the optimum cleaning action to be obtained with a minimum of wear upon the parts and at a great saving in time. As stated, the shield 21, plate 23 and restricted passage 28 cooperate in this arrangement of housings and with the conveyor and saw assembly to obtain the very excellent result of feeding a substantially continuous uniform layer of fibers to the brush roll 14. With the present invention a most efficient recovery of fibers is obtained.

Various modifications of this machine may be resorted to, all of which are comprehended within the appended claims.

The hoods as shown are substantially semi-cylindrical and arranged in the same horizontal plane. They communicate with each other and the conveyor system by reason of the entrance opening between plate 23 and the saw assembly and the restricted passage 28.

The conveyors 11 and 15 are disposed in the same vertical plane and move in substantially parallel horizontal planes.

The plate 21 has it lower end and the widest portion of the flared passage 21' in close enough proximity to the saw assembly as shown to accomplish its several functions.

The machine may be continuously operated and insures uniform treatment of the material.

I claim:

1. A cotton burr extractor comprising a casing, a rotary saw assembly, brush roll and stripper roll therein, and a feeding conveyor moving in a trough for feeding cotton to said assembly, a member disposed between the conveyor and stripper roll for regulating the thickness of the layer on the saw assembly fed to said stripper roll, said member cooperating with the stripper roll to distribute and return material thrown off by said roll away from that being fed to the assembly or about to be fed thereto and deposit it in the conveyor.

2. A cotton burr extractor comprising a casing, a rotary saw assembly, brush roll and stripper roll therein, and a feeding conveyor moving in a trough for feeding cotton to said assembly in the direction of its rotary movement, a member disposed between the conveyor and stripper roll for regulating the thickness of the layer on the saw assembly fed to said stripper roll, said member cooperating with the stripper roll to distribute and return material thrown off by said roll away from that being fed to the assembly or about to be fed thereto and deposit it in the conveyor, the flights of said conveyor being so arranged that the returned material will be first mixed with untreated material and then fed therewith to the assembly.

3. A cotton burr extractor comprising a casing, a feeding conveyor, a saw assembly, a rotating stripper roll, a hood in which said stripper roll revolves, a second hood above said conveyor, a deflector plate forming one wall of the hoods, and spaced from the periphery of the saw assembly to form a passage of sufficient width to cooperate with said second hood and permit hulls and trash to be thrown to the far side of the conveyor by said stripper roll without interference from air currents or draft created by the rotary motion of the stripper roll and out of the path of cotton being fed to the saw assembly by the conveyor.

4. A cotton burr extractor comprising a casing, a feeding conveyor, a saw assembly, a rotating stripper roll, a hood in which said stripper roll revolves, a second hood above said conveyor, a deflector plate forming one wall of the hoods, and spaced from the periphery of the saw assembly to form a passage of sufficient width to cooperate with said second hood and permit hulls and trash to be thrown toward the conveyor by said stripper roll without interference from air currents or draft created by the rotary motion of the stripper, and a member disposed adjacent the saw assembly forming a passage therewith, said member cooperating with said plate and second hood and with the stripper roll to direct the material thrown off from the stripper roll through said hood to the conveyor.

5. A cotton burr extractor comprising a casing, a saw assembly, a conveyor feeding to the saw assembly, a rotating stripper roll, means between the conveyor and the stripper roll to regulate the thickness of the layer of material on the saw assembly, a hood in which said stripper roll revolves, a deflector plate forming one wall of the hood and spaced from the periphery of the saw assembly to form a passage of sufficient width to permit hulls and trash to be thrown toward the conveyor by said stripper roll without interference from air currents or draft created by the rotary motion of the stripper, a second hood in which a brusher roll rotates in an opposite direction to that of the stripper roll, and a restricted passage between said hoods to maintain a draft moving with the saw to hold cotton upon the saw during movement between the stripper roll and brush roll.

6. A cotton burr extractor comprising a casing, a feeding conveyor, a saw assembly, a rotating stripper roll, a hood in which said stripper roll revolves, a deflector plate forming one wall of the hood and spaced from the periphery of the saw assembly to form a passage of sufficient width to permit hulls and trash to be thrown toward the conveyor by said stripper roll without interference from air currents or draft created by the rotary motion of the stripper, a second hood in which a brusher roll rotates in an opposite direction to that of the stripper roll, and a restricted passage between said hoods, said last mentioned passage being defined by the saw assembly and means connecting the lower ends of adjacent sides of said hoods.

7. A cotton burr extractor comprising a casing, a rotary saw assembly, brush roll and stripper roll therein, and a feeding conveyor moving in a trough for feeding cotton to said assembly, a second conveyor situated beneath said first conveyor and trough and receiving material from the first conveyor to pass it in contact with the assembly, and a stripper plate of angle iron formation having one side secured to the undersurface of said trough and having its other side projecting at an angle to said saw assembly with its free edge in close proximity to said assembly.

8. A burr extractor comprising a casing cover, a feeding conveyor, a saw assembly, a rotating stripper, means between the conveyor and stripper roll to regulate the thickness of the layer of material on the saw assembly, a hood in which said stripper revolves, a brush roll, a second hood in which said brush roll rotates in a direction opposite to that of the stripper roll, and a restricted passage between said hoods, and defined by the saw assembly and means connecting the lower ends of adjacent sides of said hoods, said passage maintaining a draft movement with the saw to hold cotton upon the saw during movement between the stripper roll and brush roll.

ALEXANDER S. MACKENZIE.